(12) United States Patent
Schneidau et al.

(10) Patent No.: US 8,479,961 B2
(45) Date of Patent: Jul. 9, 2013

(54) DEVICE HOLDER OF A TRANSPORT APPARATUS

(76) Inventors: Tim Schneidau, Arlington, VA (US); Heather Prattas, Surfside, FL (US)

( * ) Notice: Subject to any disclaimer, the term of this patent is extended or adjusted under 35 U.S.C. 154(b) by 477 days.

(21) Appl. No.: 12/388,764

(22) Filed: Feb. 19, 2009

(65) Prior Publication Data
US 2009/0212083 A1   Aug. 27, 2009

Related U.S. Application Data

(66) Substitute for application No. 61/064,119, filed on Feb. 19, 2008.

(51) Int. Cl.
  *B60R 11/00*  (2006.01)
  *B62B 9/00*  (2006.01)

(52) U.S. Cl.
  USPC .................. 224/409; 224/929; 280/47.38

(58) Field of Classification Search
  USPC .......... 224/275, 409, 572, 929, 555, 426, 224/407; 248/218.4; 280/47.38; 220/475; 211/119.007; 297/188.06
  See application file for complete search history.

(56) References Cited

U.S. PATENT DOCUMENTS

| | | | | |
|---|---|---|---|---|
| 1,708,906 | A | * | 4/1929 | Sparks et al. .................. 224/409 |
| 4,398,748 | A | * | 8/1983 | Duvignacq ................... 280/644 |
| 5,354,119 | A | * | 10/1994 | Nicholas .................. 297/188.07 |
| 5,704,527 | A | * | 1/1998 | Struzer ........................ 224/547 |
| 6,126,927 | A | * | 10/2000 | Provancal et al. .............. 424/65 |
| 6,766,930 | B2 | * | 7/2004 | Dixon et al. ................... 224/409 |
| 7,207,469 | B2 | * | 4/2007 | Hussaini et al. .............. 224/275 |
| 7,301,757 | B2 | * | 11/2007 | Lee et al. .................. 361/679.27 |
| 7,487,978 | B2 | * | 2/2009 | Tutmaz et al. ............. 280/47.38 |
| 7,487,979 | B2 | * | 2/2009 | Ferraioli ..................... 280/47.38 |
| 7,861,991 | B1 | * | 1/2011 | Sylvertooth-Jackson . 248/274.1 |
| 2002/0102908 | A1 | * | 8/2002 | Chan ............................. 446/269 |
| 2005/0023312 | A1 | * | 2/2005 | Steinberg ...................... 224/275 |
| 2005/0105254 | A1 | * | 5/2005 | Lee et al. ..................... 361/679 |
| 2006/0113342 | A1 | * | 6/2006 | Hampton et al. ............. 224/409 |
| 2008/0111331 | A1 | * | 5/2008 | Koehl ......................... 280/47.38 |
| 2009/0188881 | A1 | * | 7/2009 | Travis ........................ 211/131.1 |

\* cited by examiner

*Primary Examiner* — Justin Larson
(74) *Attorney, Agent, or Firm* — Patents on Demand, P.A.; Brain K. Buchheit; Scott M. Garrett

(57) ABSTRACT

A device holder for a transport apparatus having a user storage compartment which includes a main body detachably coupled to the transport apparatus and a device storage compartment disposed on the main body to store a device therein, wherein the main body is coupled to the transport apparatus to provide a line of sight to a user disposed in the user storage compartment.

17 Claims, 10 Drawing Sheets

DEVICE HOLDER OF A TRANSPORT APPARATUS

CROSS-REFERENCE TO RELATED APPLICATIONS

This application claims the benefit of U.S. Provisional Patent Application No. 61/064,119, filed on Feb. 19, 2008, in the U.S. Patent and Trademark Office, the disclosure of which is incorporated herein in its entirety by reference.

BACKGROUND OF THE INVENTION

1. Field of the Invention

The present general inventive concept generally relates to a device holder, and more particularly, to a device holder capable of being attached to a transport apparatus, such as a stroller.

2. Description of the Related Art

Various features have been developed in order to enhance a comfort level of a user of a transport apparatus, such as a stroller. However, these features are often limited to enhancing a comfort level of the user who moves and navigates the stroller (hereinafter "user"), rather than a user, such as a child, being transported by the stroller (hereinafter "rider").

For example, a conventional beverage holder has been previously developed which includes a beverage containing receptacle and a clip which affixes to a handle bar from which the user moves and navigates the transport apparatus. However, the conventional beverage holder does not directly enhance a comfort level of the rider, since the beverage holder is disposed at some distance away from the rider. Accordingly, it is very difficult for the rider to access or use the conventional beverage holder.

Furthermore, conventional armbands have also been developed which are used to carry small portable media devices. However, these conventional armbands are not capable of being affixed to the transport apparatus in such a manner as to provide access to the media device stored therein to the rider.

Accordingly, a device holder capable of being affixed to a transport apparatus, such as a rearward facing stroller, which provides a user being transported direct access to the device stored therein is desired.

SUMMARY OF THE INVENTION

The present general inventive concept provides an apparatus and method to attach a device holder to a portable or transport apparatus.

Additional features and/or utilities of the present general inventive concept will be set forth in part in the description which follows and, in part, will be obvious from the description, or may be learned by practice of the general inventive concept.

The foregoing and/or other features and utilities of the present general inventive concept may be achieved by providing a device holder for a transport apparatus having a user storage compartment which includes a main body detachably coupled to the transport apparatus, a device storage compartment disposed on the main body to store a device therein, wherein the main body is coupled to the transport apparatus to provide a line of sight to a user disposed in the user compartment.

The foregoing and/or other features and utilities of the present general inventive concept may be achieved by providing a device holder for a transport apparatus having a user storage compartment which includes a main body detachably coupled to the transport apparatus, a device storage compartment disposed on the main body to store a device therein, wherein the main body is coupled to the transport apparatus to provide a line of sight to a user disposed in the user compartment.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE PREFERRED EMBODIMENTS

Figure 1:
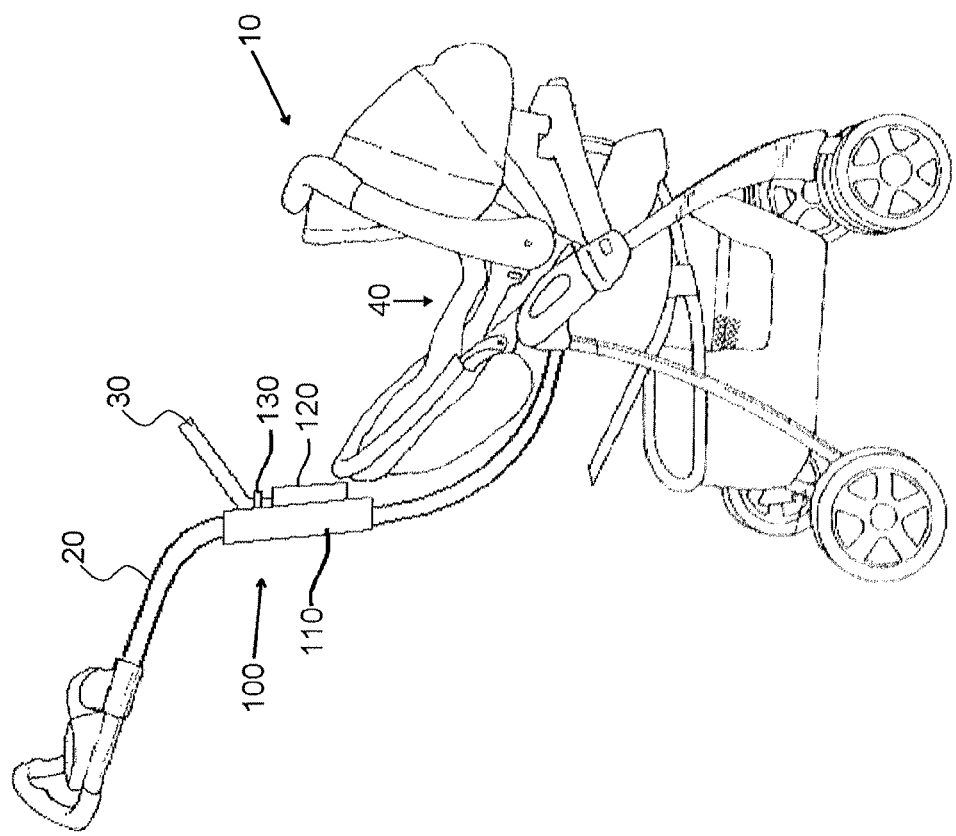
FIG. 1 is a front perspective view illustrating a device holder according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Although the present general inventive concept is illustrated as being affixed to a rear-facing stroller, the present general inventive concept is not limited to this type of transport apparatus. That is, in alternative exemplary embodiments, the present general inventive concept may also be capable of being affixed to other types of user transport apparatuses, including but not limited to, forward facing strollers, detachable baby/toddler car seats, portable apparatuses and/or portable seats. In addition, although exemplary embodiments of the present general inventive concept are described as having a DVD storage compartment, it will be understood that exemplary embodiments of the present general inventive concept may include storage compartments for various other devices, such as personal digital assistants (PDA's), cellular phones, pocket PC's, video game systems, or etc.

Figure 2:
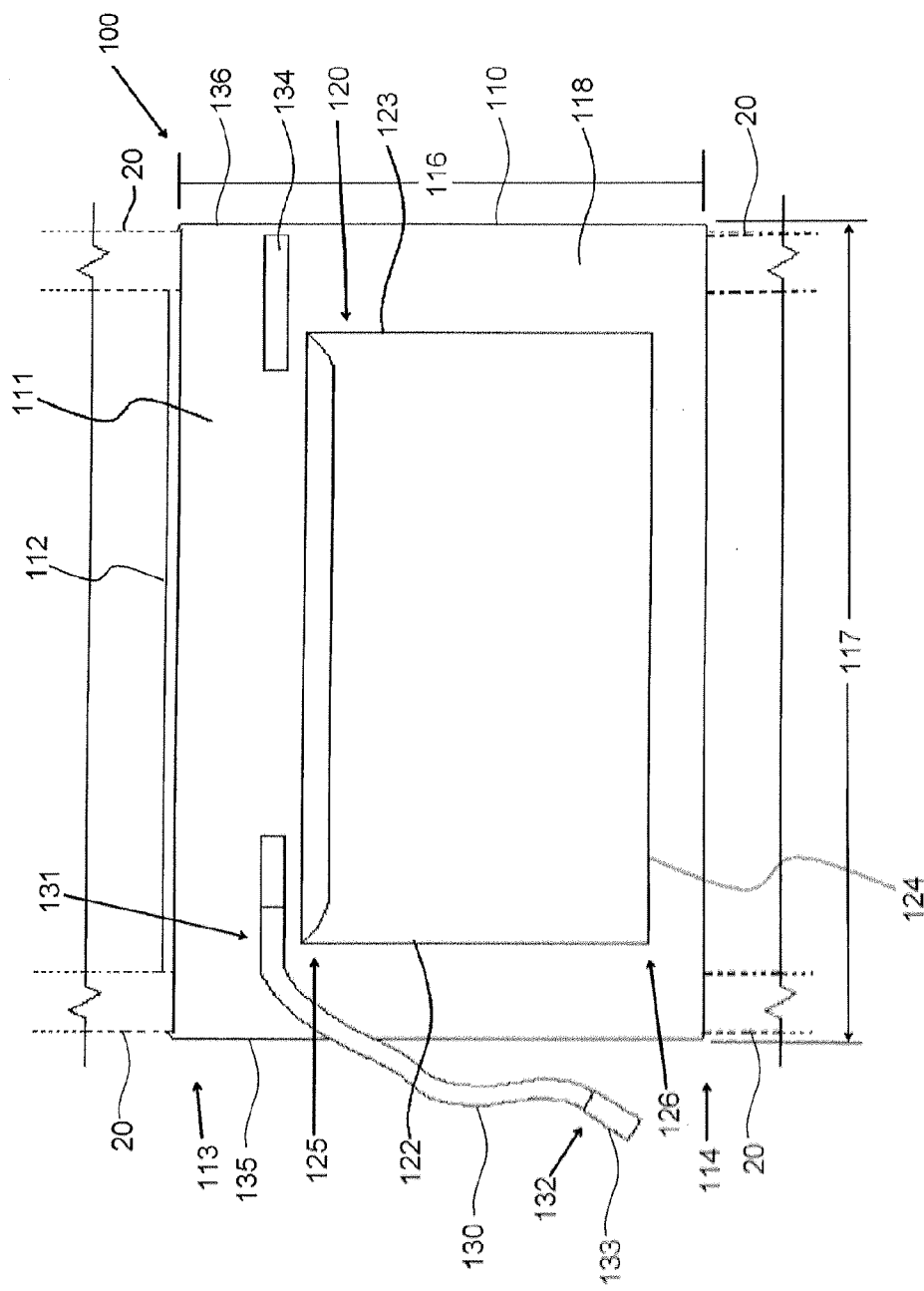
FIG. 2 is a front perspective view of the device holder of FIG. 1.
Figure 3:
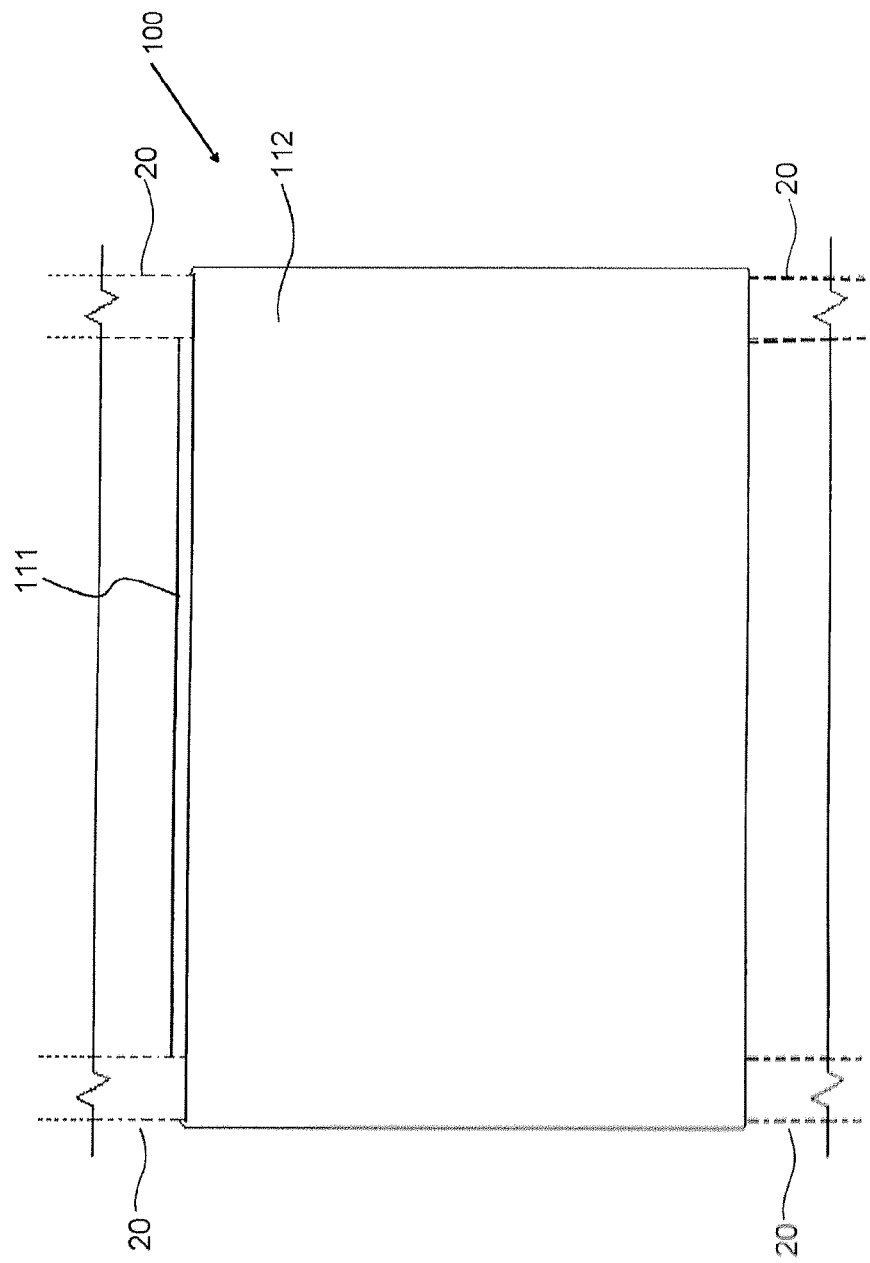
FIG. 3 is a back perspective view of the device holder of FIG. 1.

FIG. 1 is a front perspective view illustrating an exemplary embodiment of a device holder according to the present general inventive concept in association with an illustrative transport apparatus. FIG. 2 is a front perspective view of the device holder of FIG. 1. FIG. 3 is a back perspective view of the device holder of FIG. 1 and FIG. 4 is a top plan cross-sectional view of the device holder of FIG. 1.

Referring to the drawings, FIGS. 1 through 4 illustrate an exemplary embodiment of a device holder 100 according to the present general inventive concept. The device holder 100 includes a main body 110 and a device storage compartment 120. As illustrated in FIG. 1, the device holder 100 may be detachably coupled to handle bars 20 of a user transport apparatus 10, such as a stroller, so that a device 30 stored within the device storage compartment 120 may be visible from a child compartment 40 of the stroller 10. However, the present general inventive concept is not limited thereto. That is, in alternative exemplary embodiments, the device holder 100 may be detachably coupled to various other portions of the stroller 10 so that a child placed within a user storage compartment 40 may have a clear line of sight to a device 30 stored within the device storage compartment 120.

Referring now to FIGS. 2 and 3, in exemplary embodiments, the main body 110 of the device holder 100 includes front and back sides 111 and 112 and top and bottom ends 113 and 114. The main body 110 may have a predetermined height 116 which may correspond to a desired dimension of a device 30 to be stored thereby and a predetermined width 115 which may correspond to a desired dimension of the stroller 10. In alternative exemplary embodiments, the width 115 of the main body 110 may correspond to a distance between two handle bars 20 of the stroller 10, and the height 116 of the main body 110 may correspond with a desired portion of the handle bars 20.

Figure 4:
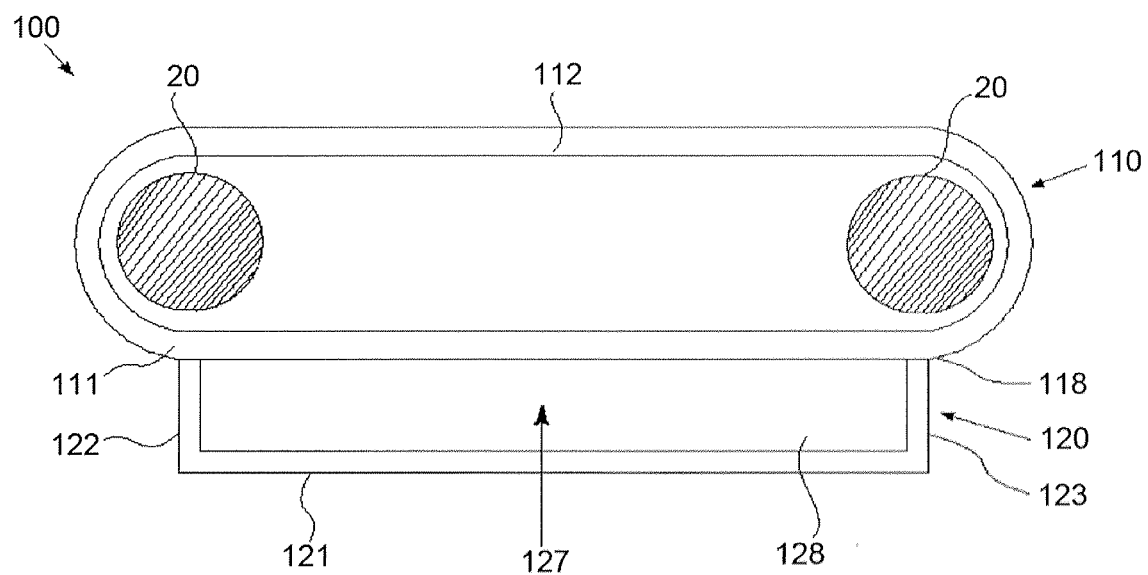
FIG. 4 is a top cross-sectional view of the device holder of FIG. 1.

In an exemplary embodiment, the front side 111 and the back side 112 of the main body 110 may be integrally formed from a single sheet of material into various shapes, such as a cylindrical shape (see FIGS. 2 through 4). In further exemplary embodiments, the main body 110 may include various elastic materials which allow the main body 110 to be easily installed onto and/or over the handle bars 20 of the stroller 10. However, the present general inventive concept is not limited thereto. That is, in alternative exemplary embodiments, the main body 110 may be formed of multiple sheets of other materials, such as thermoplastics, which may be detachably coupled to the handle bars 20 of the stroller 10.

Referring to FIGS. 2 and 4, the device holder 100 includes the device storage compartment 120 coupled to a surface 118 of the main body 110. The device storage compartment 120 may include a front wall 121, first and second sidewalls 122 and 123, and a bottom wall 124. In addition, the device storage compartment 120 has a top end 125 and a bottom end 126 which respectively correspond with the top and bottom ends 113 and 114 of the main body 110.

In further exemplary embodiments, the front wall 121, the first and second sidewalls 122 and 123, and the bottom wall 124 may define a cavity 127, wherein a device 30 (see FIG. 5), such as a DVD player, may be stored. In addition, the device storage compartment 120 includes an opening 128 disposed at the top end 125 of the device storage compartment 120 to provide access to the cavity 127. The device 30 may be stored within the cavity 127 of the device storage compartment 120.

In alternative exemplary embodiments, the device storage compartment 120 may further include a cover (not illustrated) disposed at the top end 125 of the device storage compartment 120 which may be used to close the cavity 127 from an external environment. That is, the cover may be used to completely isolate the cavity 127 from the external environment.

In further exemplary embodiments, the main body 110, the device storage compartment 120, and/or the cover may be formed of a material which protects the device 30 from the external environment. For example, in an exemplary embodiment, the main body 110 may be formed of material which is waterproof in order to protect the device 30, which may be stored within the device storage compartment 120, from moisture. However, the present general inventive concept is not limited thereto. That is, in alternative exemplary embodiments, the main body 110 may formed of a material which may protect the device 30 from electrostatic discharge (ESD). In addition, in alternative exemplary embodiments, the main body 110 and the device storage compartment 120 may be formed of various other materials, shapes, and sizes, as desired.

In further exemplary embodiments, the device storage compartment 120 may be formed of a similar or substantially similar material as that of the main body 110. However, the present general inventive concept is not limited thereto. However, the present general inventive concept is not limited thereto. That is, in alternative exemplary embodiments, the device storage compartment 120 may include a plastic or metal portion in order to provide structural support from the storage compartment 120 and also to protect the device 30 stored therein from external forces.

In alternative exemplary embodiments, the cavity 127 which is defined by the device storage compartment 120 may also provide storage for the device 30 while the device 20 is not in use. For example, as illustrated in FIG. 1, the device storage compartment 120 provides storage for the device 30 while the device 30 is being used. However, although not illustrated, the device storage compartment 120 may also provide storage for the device 30, when the device 30 is not being used.

In an alternative exemplary embodiment, referring now to FIG. 2, the main body 110 may further include a fixing member 130 which has a freely disposed first end 131 and a second end 132 which is coupled to the surface 118 of the main body 110. In exemplary embodiments, the fixing member 130 may be disposed between the top end 113 of the main body 110 and the top end 125 of the device storage compartment 120.

In further exemplary embodiments, the fixing member 130 may be formed in various shapes, such as rectangular or cylindrical shape. The fixing member 130 may be made from an elastic or non-elastic type material. However, the present general inventive concept is not limited thereto. That is, the fixing member 130 may be formed in various other shapes and/or materials, as desired.

In exemplary embodiments, the first end 131 of the fixing member 130 may be attached to the surface 118 of the main body surface, and the second end 132 may be detachably coupled to the main body surface 118. In the current exemplary embodiment, the first end 131 of the fixing member 130 may be attached to an area of the surface 118 of the main body 110 disposed between a first side 135 of the main body 110 and the first sidewall 122 of the device storage compartment 120.

The second end 132 of the fixing member 130 may include a first securing portion 133, such as a portion of Velcro™, a hook, a button, a snap, or other coupling device, attached thereto in order to be detachably coupled to a second securing portion 134, such as a portion of Velcro™, a hook, a button, a snap, or other coupling device, which is coupled to the surface 118 of the main body 110.

In the current exemplary embodiment, the second securing portion 134 may be coupled to an area of the surface 118 of the main body 110 disposed between a second side 136 of the main body 110 and the second sidewall 123 of the device storage compartment 120.

In exemplary embodiments, as illustrated in FIGS. 1 through 4, the device holder 100 may be installed over the handle bar 20 portion of a stroller 10. The device storage compartment 120 may then be positioned such that a child disposed within the user storage compartment 40 may have a clear line of sight to a device 30 which may be held by the device holder 100.

Figure 5:
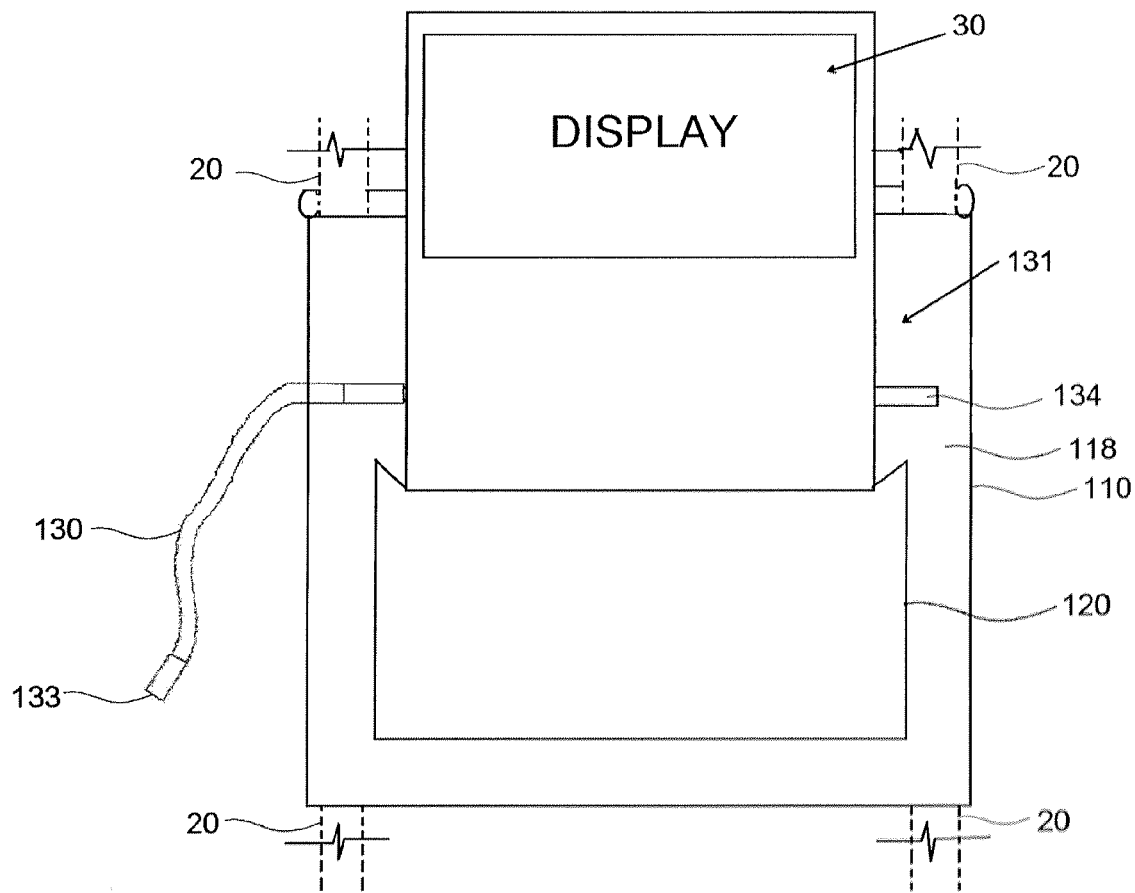
FIG. 5 is a front perspective view of the device holder of FIG. 1 having a device stored therein.
Figure 6:
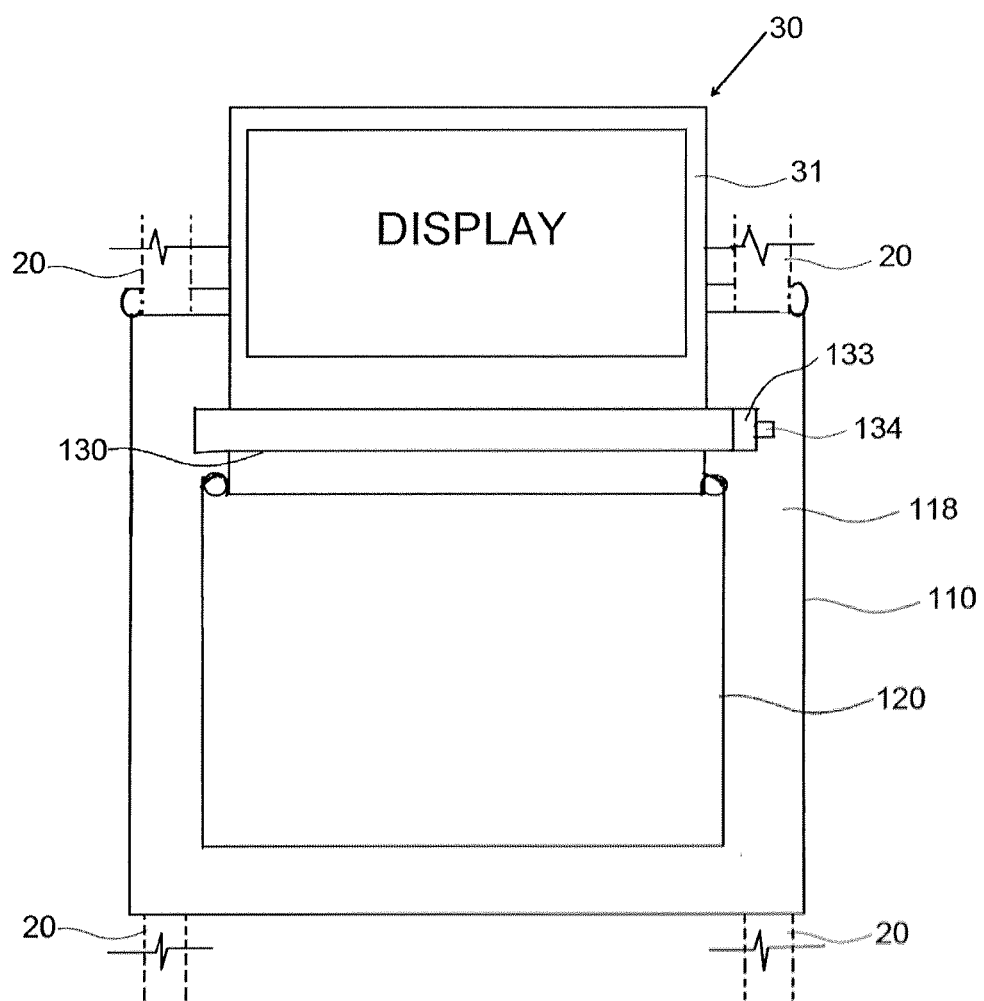
FIG. 6 is a front perspective view of the device holder of FIG. 1 having a device stored therein and secured by a fixing member.

Referring to FIGS. 4 through 6, a device 30 may be inserted into the cavity 127 through the opening 128 of the device storage compartment 120. The second end 132 of the fixing member 130 may be wrapped across a front side of the device 30 in order to couple the first securing portion 133 with the second securing portion 134 to thereby secure the device 30 to the device holder 100. However, the present general inventive concept is not limited thereto. That is, in alternative exemplary embodiments, the fixing member 130 may be configured to secure a portion of the device 30.

Figure 7:
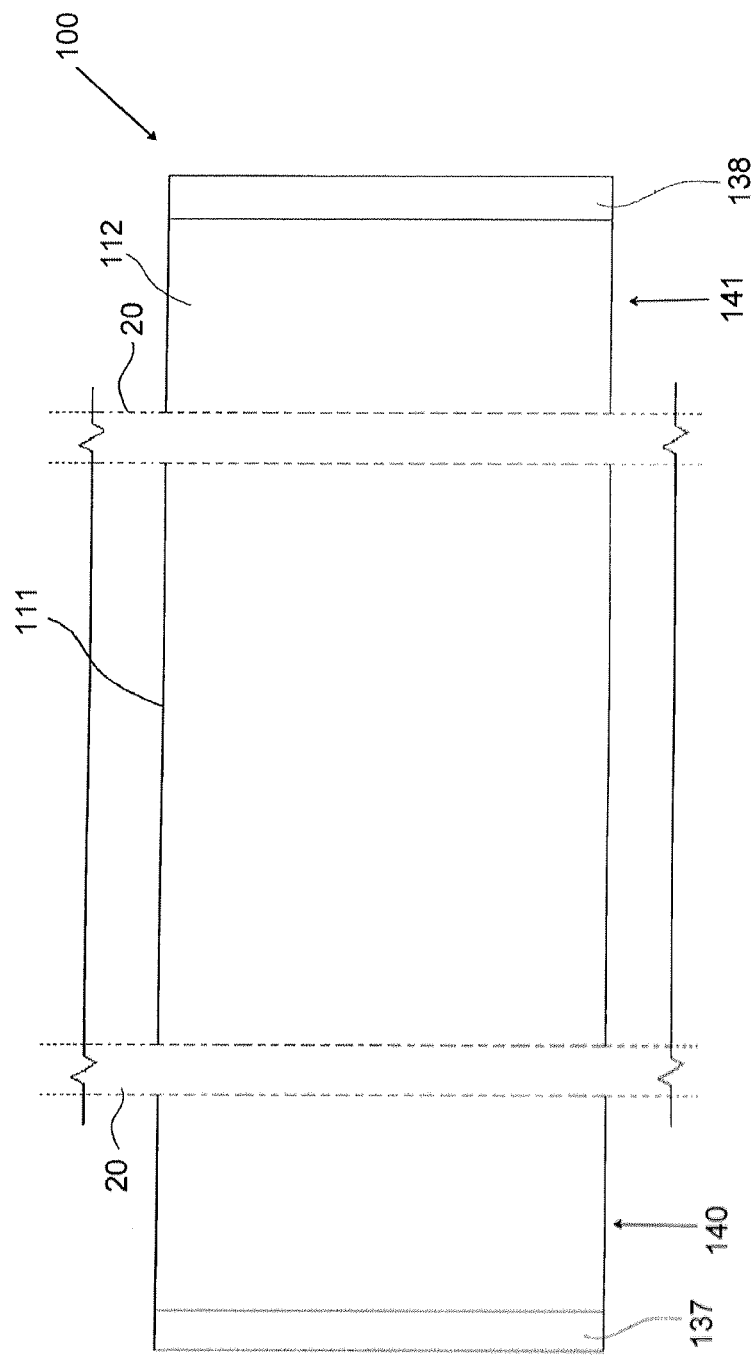
FIG. 7 is a back view of another exemplary embodiment of a device holder according to the present general inventive concept.

Referring to FIG. 7, in an alternative exemplary embodiment, the back side 112 of the device holder 200 may further include securing portions 137 and 138 disposed in a manner such that the back side 112 may be detachably from the front side 111. That is, in an exemplary embodiment, the main body 110 may be formed from a single sheet of material having a first end 140 and a second end 141, wherein the securing portions 137 and 138 allow for the first end 140 to be detachably coupled to the second end 141. The securing portions 137 and 138 may be similar or substantially similar to the coupling devices of the first and second securing portions 133 and 134. However, the present general inventive concept is not limited thereto. That is, the securing portions 137 and 138 may also include any detachable coupling device known in the art.

In an exemplary embodiment, the device holder 100 may be attached to the stroller 20 by first detaching the first end 140 from the second end 141 and then positioning the device holder 200 onto the stroller 10 such that the device storage compartment 120 faces the user storage compartment 40. The securing portion 137 may then be attached the securing portion 138 to thereby assemble the device holder 200 onto the stroller 10.

Figure 8:
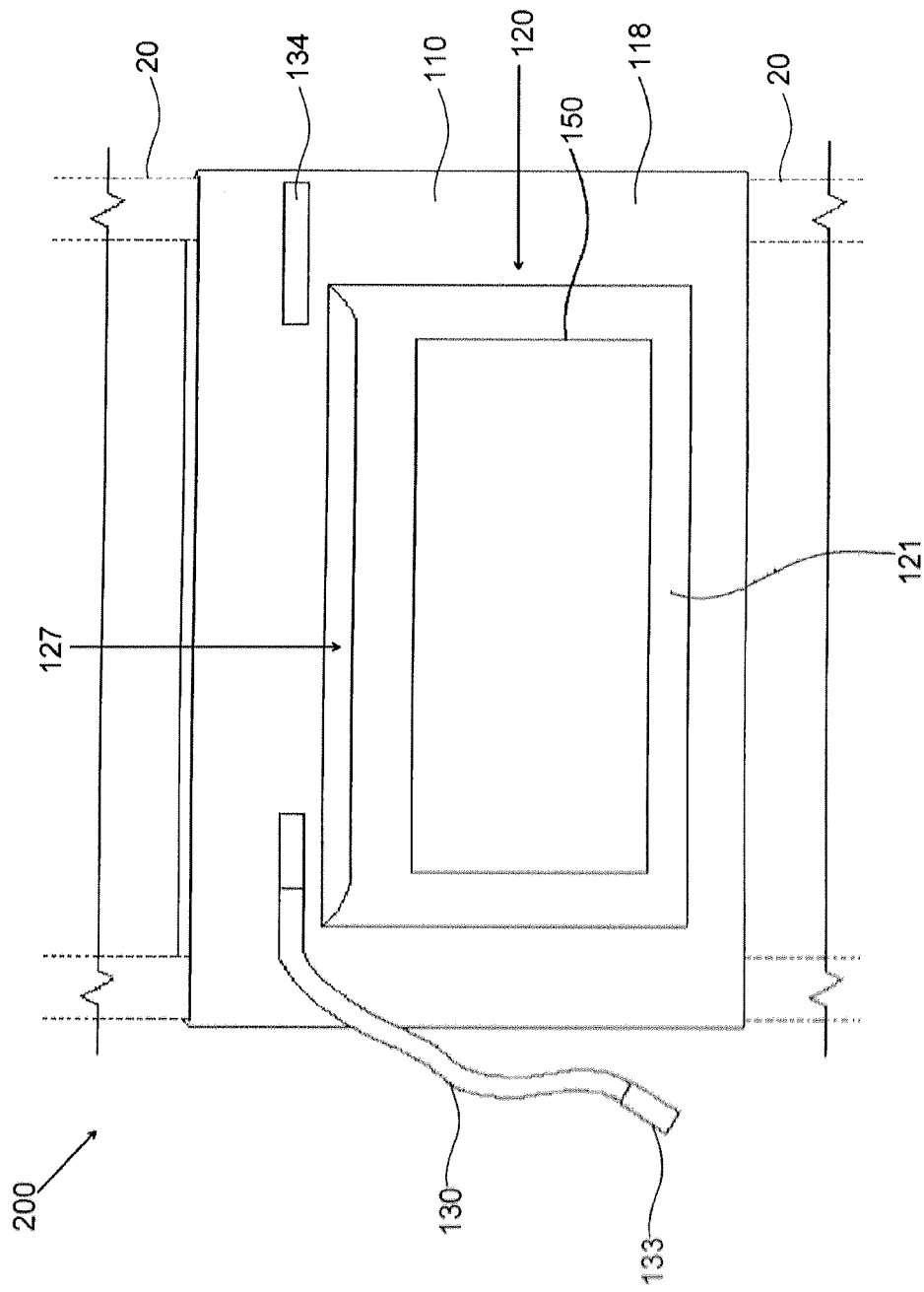
FIG. 8 is a front perspective view of another exemplary embodiment of a device holder according to the present general inventive concept.

Referring now to FIG. 8, in an alternative exemplary embodiment of the present general inventive concept, the device holder 200 includes a device storage compartment 120 which may include a portion 150 disposed on a front wall 121 to thereby provide visibility to a device 30 stored within the device storage compartment 120. In exemplary embodiments, the transparent portion 150 may be formed of a transparent thermoplastic material. However, the present general inventive concept is not limited thereto.

Figure 9:
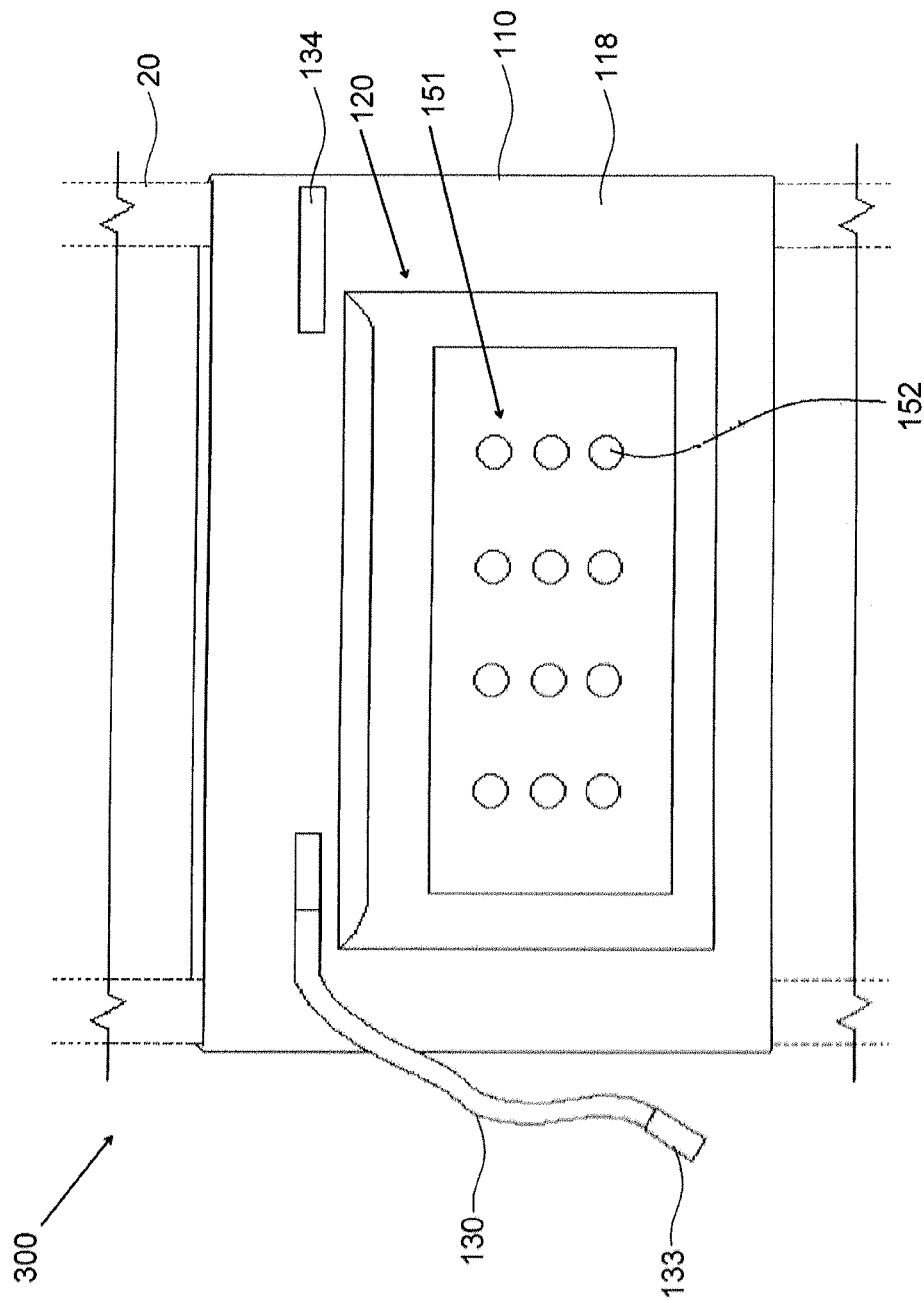
FIG. 9 is a back view of another exemplary embodiment of a device holder according to the present general inventive concept in an unassembled state.

Referring now to FIG. 9, in an alternative exemplary embodiment of the present general inventive concept, the device holder 300 includes a device storage compartment 120 which includes similar elements and features as described above and also includes a penetrating portion 151 disposed on a front wall 121 of the device storage compartment 120. In exemplary embodiments, the penetrating portion 151 includes a plurality of thru-holes 152 which may correspond to user input portions, such as buttons, of a device 30 stored within the device storage compartment 120. In exemplary embodiments, the penetrating portion 151 may be formed in a circular shape. However, the present general inventive concept is not limited thereto. That is, in exemplary embodiments, the penetrating portion 151 may correspond to a size, shape, and location of input portions of the device 30.

Figure 10:
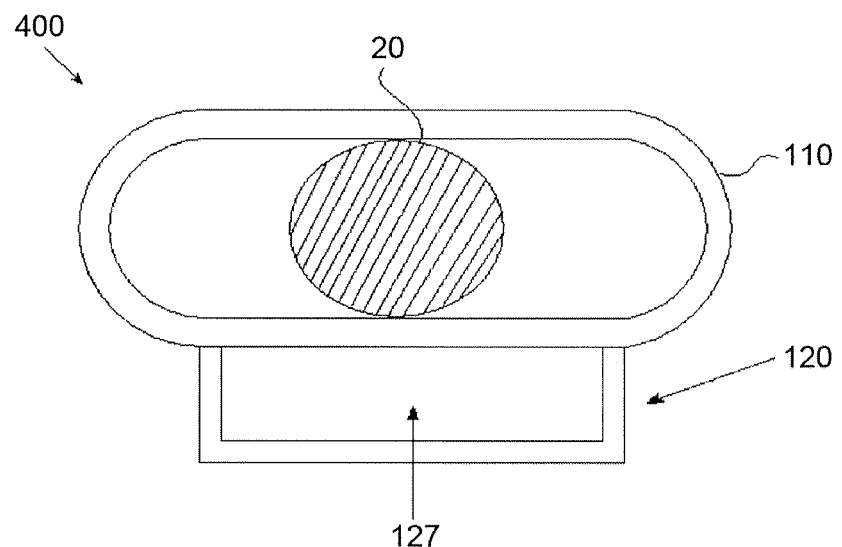
FIG. 10 is a top plan cross-sectional view illustrating a device holder according to an exemplary embodiment of the present general inventive concept.

Referring now to FIG. 10, in an alternative exemplary embodiment of the present general inventive concept, the device holder 400 includes a main body 110 which is capable of being attached to a single handle bar 20 of a stroller 10. That is, in the current exemplary embodiment, the main body 110 may include a dimension which corresponds to a dimension of a single handle bar 20 of a stroller so that the main body 110 may be detachably coupled to the single handle bar 20.

Figure 11:
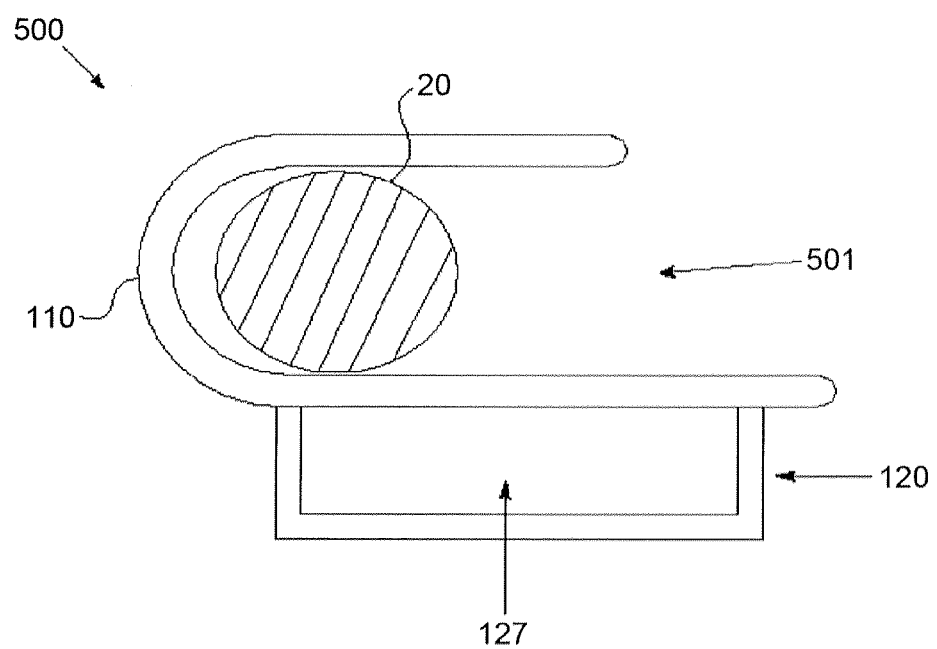
FIG. 11 is a top plan cross-sectional view illustrating a device holder according to an exemplary embodiment of the present general inventive concept.

Referring now to FIG. 11, in an alternative exemplary embodiment of the present general inventive concept, the device holder 500 includes a main body 110 which is open on at least one side in order to be detachably coupled to a single handle bar 20 of the stroller 10. That is, the main body 110 may be formed in a u-shape such that the device holder 500 may be detachably coupled to the handle bar 20 of the stroller 10 by inserting/removing the device holder 500 from the handle bar 20 through an opening 501 of the main body.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A device holder for a transport apparatus having a user storage compartment, the device holder comprising:

a main body detachably coupled to a transport apparatus, wherein the transport apparatus is a wheeled apparatus designed for human locomotion via one human, referred to as a user, manually moving and navigating the wheeled apparatus by manually pushing handles of the wheeled apparatus so as to transport a rider contained within a user storage compartment of the transport apparatus, wherein the main body is integrally formed from a rigid single sheet of material in a cylindrical shape, wherein said cylindrical shape is designed to fit over the handles so that the handles are in the interior of the cylindrical shape, thereby securing the main body to handle bars of the transport apparatus; and a device storage compartment disposed on the main body to store a device therein, wherein said device is one of a dvd player, a video game system, a personal computer, a cellular phone, and a personal data assistant, wherein a width of the main body corresponds to a width between the two handles of the transport apparatus, wherein a height and the width of the main body is at least as great as a height and width of the device storage compartment, wherein the height and width of the device storage compartment is at least as great as a height and width of the device, wherein the main body is coupled to the transport apparatus to provide a line of sight to the rider of the transport apparatus to enhance a comfort level of the rider by granting the rider access to and use of the device.

2. The device holder of claim 1, wherein the transport apparatus is a rearward facing stroller.

3. The device holder of claim 1, wherein the device storage compartment comprises a first sidewall, a second sidewall, and a body wall, which define a cavity within which the device is stored.

4. The device holder of claim 1, wherein the device storage compartment is formed of a waterproof material to protect the device when the device is stored inside the storage compartment from the external environment.

5. The device holder of claim 1, wherein the device storage compartment comprises a first sidewall, a second sidewall, and a body wall, which define a cavity within which the device is stored, wherein the first sidewall, the second sidewall, and the body wall comprise rigid plastic or metal portions providing structural support that protects the device when stored therein from external forces, wherein said first sidewall and said second side wall are approximately parallel to the handles when the device holder is attached to the transport apparatus.

6. The device holder of claim 1, wherein the storage compartment comprise a first sidewall, a second sidewall, and a front wall, which define a cavity within which the device is stored, wherein a portion of the front wall is transparent to provide visibility to a screen of the device when stored inside the storage compartment.

7. The device holder of claim 1, wherein the device storage compartment comprises a first sidewall, a second sidewall, a body wall, and a top opening for inserting the device into a cavity formed by the first sidewall, the second sidewall, and the body wall, wherein the device storage compartment comprises a cover disposed at the top end of the storage compartment, wherein said cover when closed completely isolates the concavity from the external environment, thereby protecting a device inside the cavity from external environmental conditions.

8. The device holder of claim 1, wherein the transport apparatus is a stroller, and wherein the main body is formed of thermoplastic shaped to be detachably coupled to handle bars of the stroller.

9. The device holder of claim 1, wherein the device storage compartment includes a first wall, first and second sidewalls, and a bottom wall to thereby define a cavity within which the device fits, wherein the first and second sidewalls are substantially parallel to the handles when the device holder is attached to the transport apparatus.

10. The device holder of claim 1, wherein said device is a DVD player.

11. The device holder of claim 1, wherein the device storage compartment is formed of a material which protects devices stored therein from the external environment, wherein a viewing region of the device faces away from a user pushing the handles and towards the rider.

12. The device holder of claim 11, wherein the material of the device storage compartment protects devices stored therein from moisture.

13. The device holder of claim 1, further comprising a fixing member having first and second ends, the first end coupled to the main body.

14. The device holder of claim 13, wherein the second end of the fixing member includes a first securing portion attached thereto.

15. The device holder of claim 14, wherein the main body includes a second securing portion attached thereto to be detachably coupled to the first securing portion of the fixing member.

16. The device holder of claim 15, wherein the main body includes a third and fourth securing portion disposed thereon such that the front side of the main body is detachably coupled to the back side of the main body.

17. A stroller comprising:

handle bars;

wheels;

a user storage compartment; and a device holder comprising:

a main body integrally formed from a rigid single sheet of material in a cylindrical shape, wherein said cylindrical shape is designed to fit over the handle bars so that the handle bars are in the interior of the cylindrical shape, thereby securing the main body to handle bars of the transport apparatus; and a device storage compartment having a cavity defined by a front wall, first and second sidewalls, and a bottom wall to store said device therein, wherein a surface of the single sheet of material forms a side of the cavity, wherein the first and second sidewalls are approximately parallel to at least a portion of the handle bars that the main body fits over, wherein an opening of the cavity is approximately orthogonal to a plane formed by the portion of the handle bars that the main body fits over, wherein a width of the main body corresponds to a width between the two handle bars, wherein a height and the width of the main body is at least as great as a height and width of the device storage compartment, wherein the height and width of the device storage compartment is at least as great as a height and width of the device, wherein the device, when positioned within the cavity is positioned in line of sight of a rider of the user storage compartment to enhance a conform level of the rider by granting the rider access to and use of the device, wherein said device is one of a dvd player, a video game system, a personal computer, a cellular phone, and a personal data assistant.

* * * * *